US012617319B2

(12) United States Patent
Kim et al.

(10) Patent No.: US 12,617,319 B2
(45) Date of Patent: May 5, 2026

(54) RELAXATION SEAT FOR VEHICLE

(71) Applicants: Hyundai Motor Company, Seoul (KR); Kia Corporation, Seoul (KR); DAS Co., Ltd, Gyeongju-si (KR)

(72) Inventors: Byeong Kwang Kim, Ansan-si (KR); Young Bok Sung, Hwaseong-si (KR); Yong Chang Jung, Hwaseong-si (KR); Young Jun Kim, Hanam-si (KR)

(73) Assignees: Hyundai Motor Company, Seoul (KR); Kia Corporation, Seoul (KR); Das Co., Ltd, Gyeongju-si (KR)

( * ) Notice: Subject to any disclaimer, the term of this patent is extended or adjusted under 35 U.S.C. 154(b) by 473 days.

(21) Appl. No.: 18/301,498

(22) Filed: Apr. 17, 2023

(65) Prior Publication Data

US 2024/0149752 A1    May 9, 2024

(30) Foreign Application Priority Data

Nov. 7, 2022    (KR) ........................ 10-2022-0146649

(51) Int. Cl.
B60N 2/16 (2006.01)
B60N 2/10 (2006.01)

(52) U.S. Cl.
CPC ............. B60N 2/10 (2013.01); B60N 2/1615 (2013.01); B60N 2/1695 (2013.01)

(58) Field of Classification Search
CPC ...... B60N 2/1695; B60N 2/1635; B60N 2/10; B60N 2/1615; B60N 2/1625
See application file for complete search history.

(56) References Cited

U.S. PATENT DOCUMENTS

| | | | | | |
|---|---|---|---|---|---|
| 6,053,575 A | * | 4/2000 | Bauer | .................. | B60N 2/1615 |
| | | | | | 297/337 |
| 9,108,538 B2 | * | 8/2015 | Becker | .................. | B60N 2/045 |
| 10,744,909 B2 | * | 8/2020 | Kong | .................. | B60N 2/1615 |
| 11,318,864 B2 | * | 5/2022 | Fischer | ............... | B60N 2/1625 |
| 2023/0398910 A1 | * | 12/2023 | Unrau | .................. | B60N 2/165 |

FOREIGN PATENT DOCUMENTS

| | | | | | |
|---|---|---|---|---|---|
| DE | 10054346 A1 | * | 5/2002 | ........... | B60N 2/1615 |
| DE | 102017206994 B4 | * | 1/2019 | .............. | B60N 2/16 |
| DE | 102020106821 B4 | * | 9/2021 | ............. | B60N 2/165 |
| KR | 20210067586 A | | 6/2021 | | |
| KR | 102402990 B1 | * | 5/2022 | ............. | B60N 2/165 |
| WO | WO-2023244359 A1 | * | 12/2023 | .............. | B60N 2/10 |

* cited by examiner

*Primary Examiner* — Timothy J Brindley
(74) *Attorney, Agent, or Firm* — Slater Matsil, LLP

(57) ABSTRACT

An embodiment relaxation seat for a vehicle includes a seat cushion lower frame configured to be mounted on a seat rail, a seat cushion upper frame connected to the seat cushion lower frame in a tilting-enabled manner, a seat back frame connected to the seat cushion upper frame, a locking device mounted at a predetermined position on the seat cushion upper frame, a front link hinge-connecting between the seat cushion upper frame and a front end portion of the seat cushion lower frame, a rear link hinge-connecting between the seat cushion upper frame and a rear end portion of the seat cushion lower frame, and a support bar connecting between the locking device and the front link in a manner that is movable backward and forward and configured to support the front link for rotation or fixation thereof.

20 Claims, 8 Drawing Sheets

RELAXATION SEAT FOR VEHICLE

CROSS-REFERENCE TO RELATED APPLICATIONS

This application claims the benefit of Korean Patent Application No. 10-2022-0146649, filed on Nov. 7, 2022, which application is hereby incorporated herein by reference.

TECHNICAL FIELD

The present disclosure relates to a relaxation seat for a vehicle.

BACKGROUND

Usually, a seat for a vehicle basically includes a seat cushion on which an occupant sits, a seat back that the occupant leans his/her upper body against, a headrest supporting the occupant's neck and head, and the like. Various devices for adjusting seat positioning are installed at a predetermined position on the seat.

To this end, a motor-operated relaxation mechanism capable of realizing relaxation comfort positioning for taking a rest and getting some sleep while the vehicle travels a long distance is mounted in the seat for the vehicle.

The relaxation comfort positioning, as positioning for fatigue reduction, refers to positioning that is realized by maximally distributing the passenger's body pressure. When the relaxation comfort positioning is maintained, the passenger who sits on the seat can feel comfortable and relaxed as if he/she were in gravity-free space.

In other words, the relaxation comfort positioning refers to positioning that is realized by changing an angle for support of the passenger's hip, thighs, calves, and the like, in such a manner that the passenger's body can be maximally distributed, when changing an angle for support of the passenger's upper body. When the relaxation comfort positioning is maintained, the passenger can feel less fatigued and at the same time comfortable.

To this end, as illustrated in FIG. 1, a motor-operated relaxation mechanism is mounted in the seat for the vehicle. The motor-operated relaxation mechanism serves to lower a rear end portion of a seat cushion 10 and, at the same time, serves to raise a front end portion thereof, thereby reclining a seat back 20 toward the rear direction. Accordingly, the angle for support of the passenger's hip, thighs, calves, and the like is changed in such a manner that the passenger's body pressure is maximally distributed and thus that the passenger lays his/her upper body on the seat back 20.

However, the problem with the motor-operated relaxation mechanism is that many components are mounted, such a motor, a controller for controlling the motor and controlling a relaxation operation, a decelerator that is mounted on an output unit of the motor, a lead screw that is connected to an output shaft of the decelerator, and a link. Therefore, an assembling process is complicated, and manufacturing cost is increased.

SUMMARY

The present disclosure relates to a relaxation seat for a vehicle. Particular embodiments relate to a manual relaxation seat for a vehicle, the seat being capable of realizing relaxation positioning for fatigue reduction by a user's manual operation.

An embodiment of the present disclosure provides a manual relaxation seat for a vehicle, the seat being capable of performing an operation of reclining a seat back toward the rear direction and an operation of lowering a rear end portion of a seat cushion and, at the same time, raising a front end portion thereof. These operations are performed when a user leans his/her upper body against the seat back, thereby applying a load of a predetermined magnitude or greater, in a state where unlocking is performed by a locking device according to the user's operation of a lever. The manual relaxation seat can realize relaxation positioning for fatigue reduction.

According to an embodiment of the present disclosure, there is provided a relaxation seat for a vehicle, the relaxation seat including a seat cushion lower frame mounted on a seat rail, a seat cushion upper frame connected to the seat cushion lower frame in a tilting-enabled manner, a seat back frame connected to the seat cushion upper frame, a locking device mounted at a predetermined position on the seat cushion upper frame, a lever connected to the locking device in such a manner that, with the lever, it is possible to perform a locking or unlocking operation, a front link hinge-connecting between the seat cushion upper frame and a front end portion of the seat cushion lower frame, a rear link hinge-connecting between the seat cushion upper frame and a rear end portion of the seat cushion lower frame, and a support bar connecting between the locking device and the front link in a manner that is movable backward and forward and supporting the front link for rotation or fixation thereof.

In the relaxation seat, the front link may include a first front link, a lower end portion of the first front link being hinge-connected to the seat cushion lower frame, and a second front link, an upper end portion of the second front link being hinge-connected to a connection pipe fastened to the seat cushion upper frame, and a front end portion of the support bar being hinge-connected to one side of a lower end portion of the second front link, wherein an upper end portion of the first front link and the other side of the lower end portion of the second front link may be connected to each other with a hinge pin.

In the relaxation seat, a guide hole into which the hinge pin is inserted may be formed in the seat cushion upper frame in order to guide the first front link and the second front link to move along a circular path.

In the relaxation seat, a guide pin to be inserted into the guide hole may be integrally formed on the hinge pin in a manner that extends therefrom.

In the relaxation seat, a stepped portion for preventing the support bar from interfering with the first and second front links when the support bar moves backward and forward may be formed on the one side of the lower end portion of the second front link to which the front end portion of the support bar is hinge-connected, in a manner that protrudes toward an inward direction therefrom.

In the relaxation seat, a torsion spring may be inserted into the connection pipe, and thus one end portion of the torsion spring may be fixed, and the other end portion thereof may be connected to the seat cushion upper frame.

In the relaxation seat, in order to cause the torsion spring to be twisted, the other end portion of the torsion spring may pass through a spring through-hole that is formed in the seat cushion upper frame and may be fixed to a spring hanger attached to an outer surface of the seat cushion upper frame.

In the relaxation seat, a cradling bracket that supports a rear end portion of the support bar in a manner that is enabled to prevent the rear end portion thereof from falling down may be mounted on an inner portion of the seat cushion upper frame.

In the relaxation seat, a guide roller that slidably supports a bottom portion of the support bar may be mounted on a lower portion of the cradling bracket.

In the relaxation seat, a pinion gear that is rotatable when the locking device performs unlocking may be connected to an inner portion of the locking device mounted on the seat cushion upper frame, and a rack gear with which the pinion gear is engaged may be formed on an upper surface of the support bar.

In the relaxation seat, the locking device may include an input block, an input gear to be connected to a lever formed on one side of the input block, and a plurality of sawteeth, each of which has such a shape that a width thereof gradually becomes smaller toward an inward direction, being formed on the other side thereof. The locking device may further include an unlocking block, a plurality of sawtooth grooves into which the plurality of sawteeth, respectively, are inserted being formed in one side of the unlocking block, and a plurality of wedges being formed on the other side thereof, an intermediate plate having such a structure that a plurality of access holes through which the plurality of wedges, respectively, pass for entering and exiting the plurality of access holes are formed therein and combined with an external housing covering the input block, a spring arranged between the unlocking block and the intermediate plate and compressing when the unlocking block moves toward the inward direction, and a ring plate having such a structure that a plurality of position limitation grooves are formed in an inner circumferential surface thereof in such a manner as to be spaced apart at a predetermined distance and combined with the intermediate plate. The locking device may further include a plurality of brake members, each having such a structure that brake rollers constituting a pair are connected to each other by a spring and arranged in the plurality of position limitation grooves, respectively, in the ring plate, a support-bar backward-forward movement guide member including a brake contact ring capable of being brought into contact with the brake roller, a shaft integrally formed with an outer surface of the brake contact ring and rotatably connected to a center portion of the intermediate plate, and the pinion gear integrally formed with an inner surface of the brake contact ring and engaged with the rack gear of the support bar, and a cover plate mounted on the ring plate while covering the brake member and the brake contact ring.

In the relaxation seat, when the input block is rotated in a locking direction by operating the lever, the plurality of sawteeth on the input block may press against the unlocking block toward the inward direction while being removed out of the plurality of sawtooth grooves, respectively, in the unlocking block, and, as a result, each of the plurality of wedges on the unlocking block may be inserted between the brake rollers, facing each other, of the adjacent brake members, and, at the same time, the brake rollers may be brought into close contact with an outer circumferential surface of the brake contact ring by pressing thereagainst, thereby keeping the pinion gear from being rotated.

In the relaxation seat, when the input block is rotated in an unlocking direction by operating the lever, the plurality of sawteeth on the input block may be inserted into the plurality of sawtooth grooves, respectively, in the unlocking block, and due to an elastic restoring force of the spring, the unlocking block may be pushed toward an outward direction, and, as a result, each of the plurality of wedges on the unlocking block may be removed out of the brake rollers, facing each other, of the adjacent brake members, and, at the same time, the brake rollers may no longer be brought into close contact with an outer circumferential surface of the brake contact ring without being pressed thereagainst, thereby no longer keeping the pinion gear from being rotated.

The relaxation seat for a vehicle according to embodiments of the present disclosure provides the following advantageous effects.

First, in a state where the unlocking is performed by the locking device according to the user's operation of the lever, the operation of reclining the seat back toward the rear direction and the operation of lowering the rear end portion of the seat cushion and, at the same time, raising the front end portion thereof are performed when the user leans his/her upper body against the seat back, thereby applying a load of a predetermined magnitude or greater. Thus, with the user's manual operation, the relaxation positioning for fatigue reduction can be easily realized.

Second, the number of components and the manufacturing cost can be reduced when compared with a motor-operated relaxation mechanism that requires a motor, a controller, and the like.

BRIEF DESCRIPTION OF THE DRAWINGS

The above and other features of embodiments of the present disclosure will now be described in detail with reference to certain exemplary examples thereof illustrated in the accompanying drawings which are given herein below by way of illustration only, and thus are not limitative of the present disclosure, in which:

FIGS. 8 and 9 are views each illustrating a state where unlocking is performed by the locking device of the relaxation seat for a vehicle according to embodiments of the present disclosure.

DETAILED DESCRIPTION OF ILLUSTRATIVE EMBODIMENTS

Preferred embodiments of the present disclosure will be described below in detail with reference to the accompanying drawings.

Figure 1:
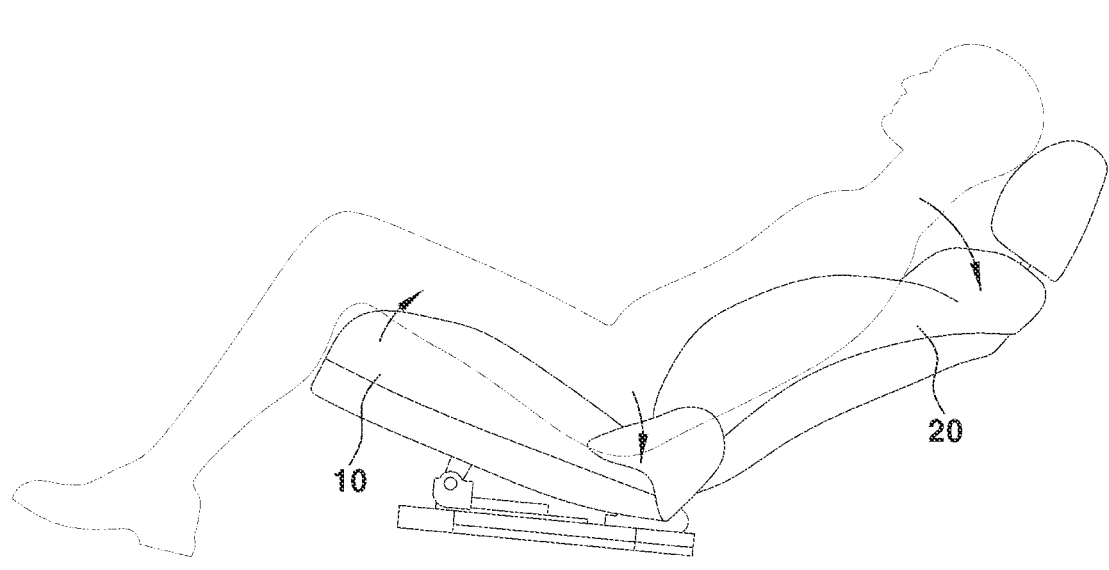
FIG. 1 is a schematic view illustrating a state where a seat for a vehicle is adjusted for realizing relaxation comfort positioning.
Figure 2:
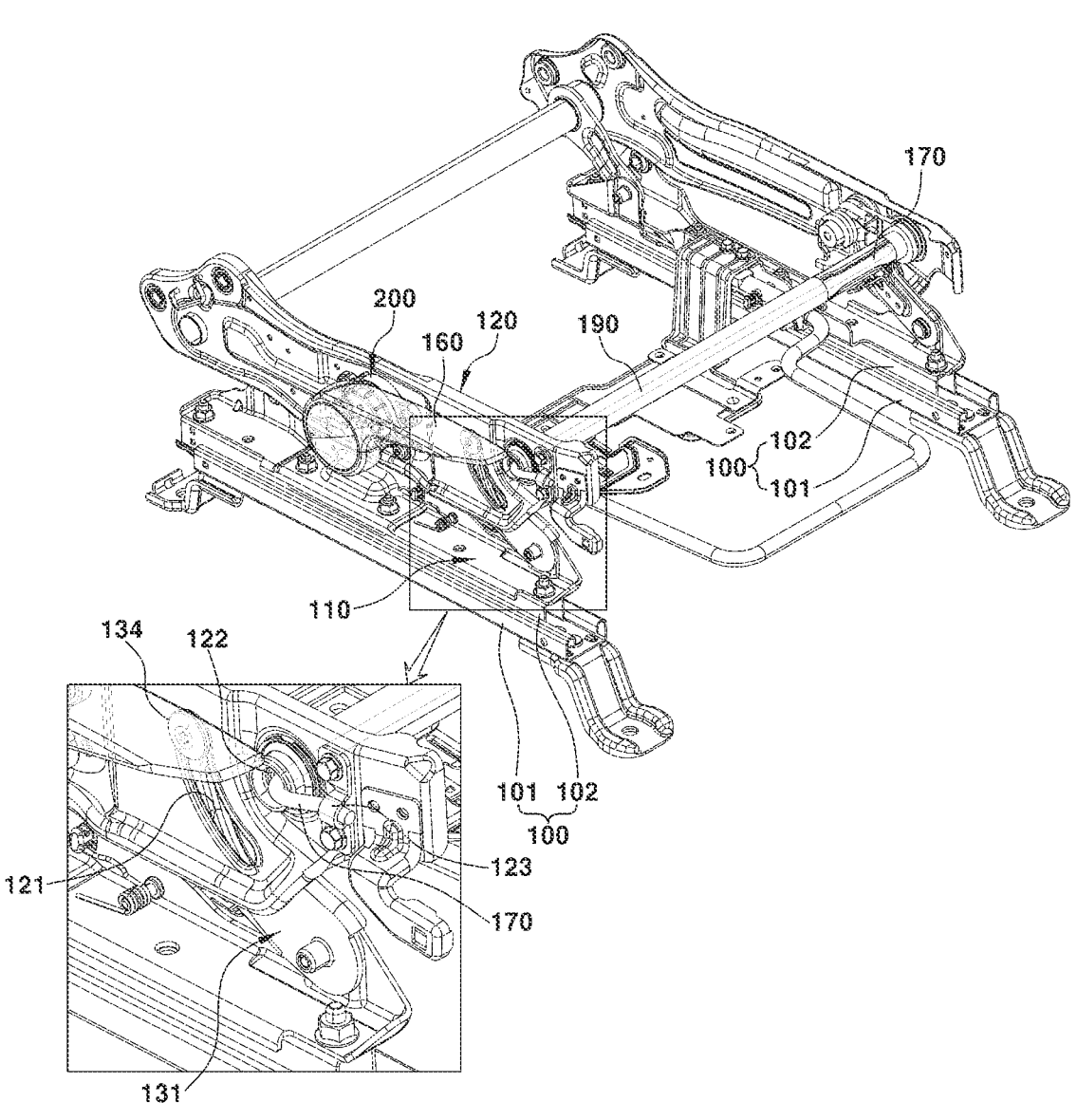
FIGS. 2 and 3 are perspective views each illustrating a relaxation seat for a vehicle according to embodiments of the present disclosure.
Figure 3:
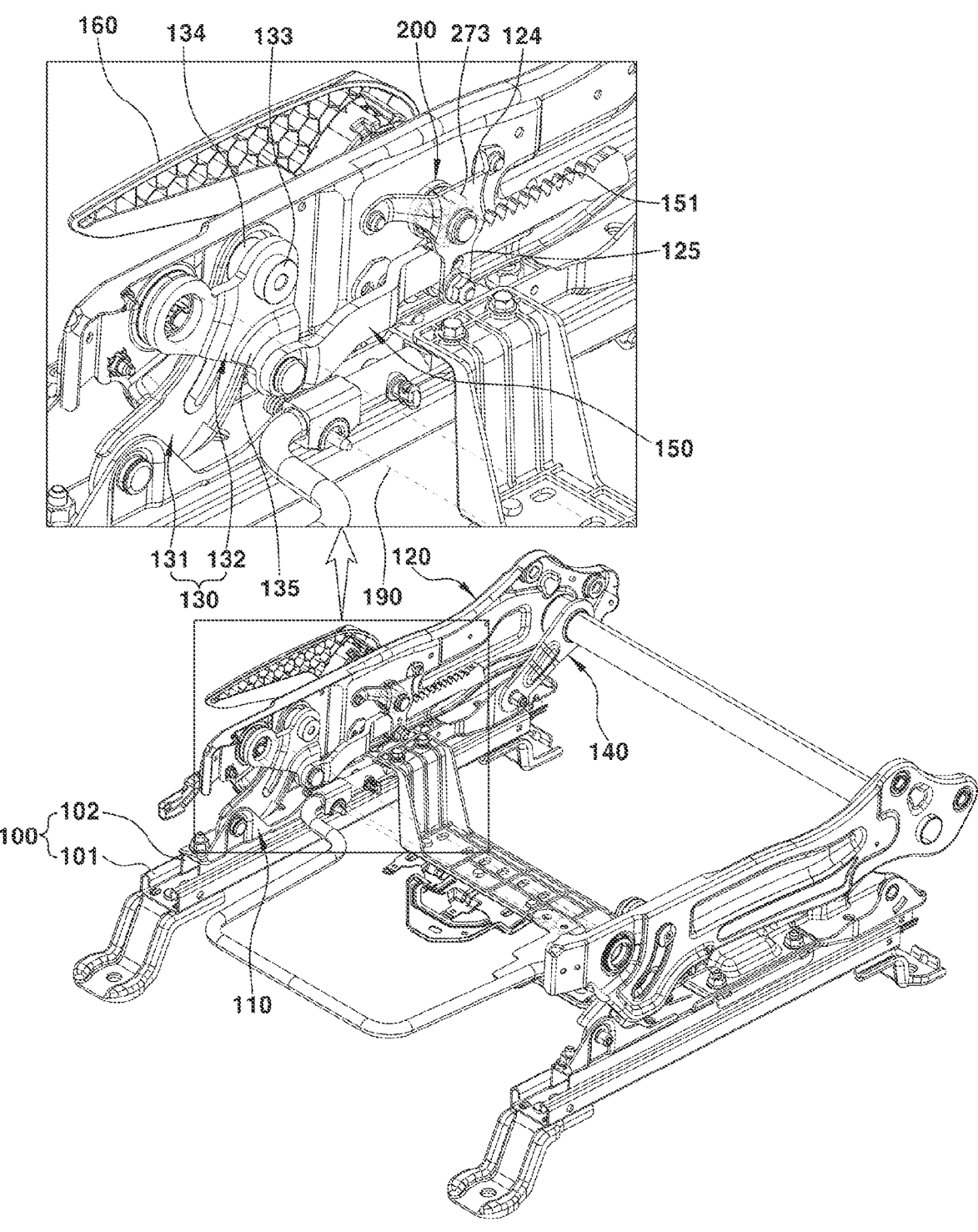

FIGS. 2 and 3 are perspective views each illustrating a manual relaxation seat for a vehicle according to embodiments of the present disclosure.

A seat rail 100 may be configured to include a stationary rail 101 that is mounted on a floor panel and a moving rail 102 that is fastened to the stationary rail 101 in a manner that is movable backward and forward.

A seat cushion lower frame 110 is connected to the seat rail 100. The seat cushion lower frame 110 is substantially mounted on the moving rail 102 of the seat rail 100.

A seat cushion upper frame 120 is connected to the seat cushion lower frame 110 in a tilting-enabled manner.

To this end, a front link 130 hinge-connects between the seat cushion upper frame 120 and a front end portion of the seat cushion lower frame 110. Moreover, a rear link 140 hinge-connects between the seat cushion upper frame 120 and a rear end portion of the seat cushion lower frame 110.

Accordingly, when the rear link 140 is rotated in a push-down direction, a rear end portion of the seat cushion upper frame 120 is lowered. Moreover, when the front link 130 is rotated in a pull-up direction, a front end portion of the seat cushion upper frame 120 is raised.

A locking device 200 is mounted at a predetermined position on the seat cushion upper frame 120. A lever 160 is connected to the locking device 200. With the lever 160, a user can perform an operation of rotating the locking device 200 in a locking direction or an unlocking direction.

In addition, a support bar 150 connects between the locking device 200 and the front link 130 in a manner that is movable backward and forward. The support bar 150 may have such a structure that it performs a function of rotating the front link 130 in the upward or downward direction by pushing or pulling, respectively, the front link 130 and holding the front link 130 when the locking device 200 performs locking.

Preferably, two or more front links 130 may be provided in order to raise the front end portion of the seat cushion upper frame 120 to a desired height and to be connected to the support bar 150 for rotating the front links 130 in the upward or downward direction.

For example, the front link 130 may be configured to include a first front link 131 and a second front link 132. A lower end portion of the first front link 131 is hinge-connected to the seat cushion lower frame 110. An upper end portion of the second front link 132 is hinge-connected to the seat cushion upper frame 120.

In addition, an upper end portion of the first front link 131 and the other side of a lower end portion of the second front link 132 are hinge-connected to each other with a hinge pin 133, and a front end portion of the support bar 150 is hinge-connected to one side of the lower end portion of the second front link 132.

Preferably, a stepped portion 135 is formed on the one side of the lower end portion of the second front link 132 to which the front end portion of the support bar 150 is hinge-connected, in a manner that protrudes toward an inward direction therefrom. The stepped portion 135 serves to prevent the support bar 150 from being brought into contact with the first and second front links 131 and 132 in an interfering manner when the support bar 150 moves backward and forward.

In this case, a guide hole 121 in the shape of a circle is formed in the seat cushion upper frame 120 in order to guide the first front link 131 and the second front link 132 to constantly move along a circular path. The hinge pin 133 is inserted into the guide hole 121.

Preferably, a guide pin 134 is integrally formed with the hinge pin 133 in a manner that extends therefrom. The guide pin 134 is substantially inserted, in a slidably movable manner, into the guide hole 121 formed in the seat cushion upper frame 120.

An upper end portion of the second front link 132 is hinge-connected to the seat cushion upper frame 120. The upper end portion of the second front link 132 is substantially hinge-connected to a connection pipe 190 for relaxation that is fastened to the seat cushion upper frame 120.

The connection pipe 190 is a pipe that connects the seat cushion upper frames 120 to each other that are arranged to both sides thereof. The connection pipe 190 connects between respective front end portions of the seat cushion upper frames 120.

In addition, a torsion spring 170 may be inserted into the connection pipe 190. Thus, one end portion of the torsion spring 170 may be fixed, and the other end portion of the torsion spring 170 may be connected to the seat cushion upper frame 120.

In order for the seat cushion upper frame 120 to realize relaxation positioning, the rear end portion thereof is lowered, and, at the same time, the front end portion thereof is raised. When this is done, the torsion spring 170 serves to provide to the seat cushion upper frame 120 an elastic restoring force that returns the seat cushion upper frame 120 to an original position thereof. Preferably, the other end portion of the torsion spring 170 passes through a spring through-hole 122 that is formed in the seat cushion upper frame 120 and is fixed to a spring hanger 123 attached to an outer surface of the seat cushion upper frame 120, in order to cause the torsion spring 170 to be twisted.

The support bar 150 is described above as connecting between the locking device 200 and the front link 130 in a manner that is movable backward and forward. However, the front end portion of the support bar 150 is substantially hinge-connected to the one side of the lower end portion of the second front link 132, and the rear end portion thereof is substantially engaged with a pinion gear 273 that is connected to an inner portion of the locking device 200 in a manner that is movable backward and forward.

To this end, the pinion gear 273 is connected to the inner portion of the locking device 200. The pinion gear 273 is rotatable when the locking device 200 performs unlocking. A rack gear 151 with which the pinion gear 273 is engaged is formed on an upper surface of the support bar 150.

In this case, a cradling bracket 124 is mounted on an inner portion of the seat cushion upper frame 120. The cradling bracket 124 supports the support bar 150 in a manner that is enabled to prevent it from falling down. A guide roller 125 is mounted on a lower portion of the cradling bracket 124. The guide roller 125 slidably supports a bottom portion of the support bar 150.

Accordingly, when the locking device 200 performs unlocking, the pinion gear 273 engaged with the rack gear 151 of the support bar 150 is in a rotatable state. Thus, the support bar 150 is in a state of being movable backward or forward. When the support bar 150 moves forward or backward, the bottom portion thereof may be brought into contact with the guide roller 125 in a sliding manner.

A specific configuration and an operative state of the locking device 200 will be described below.

Figure 6:
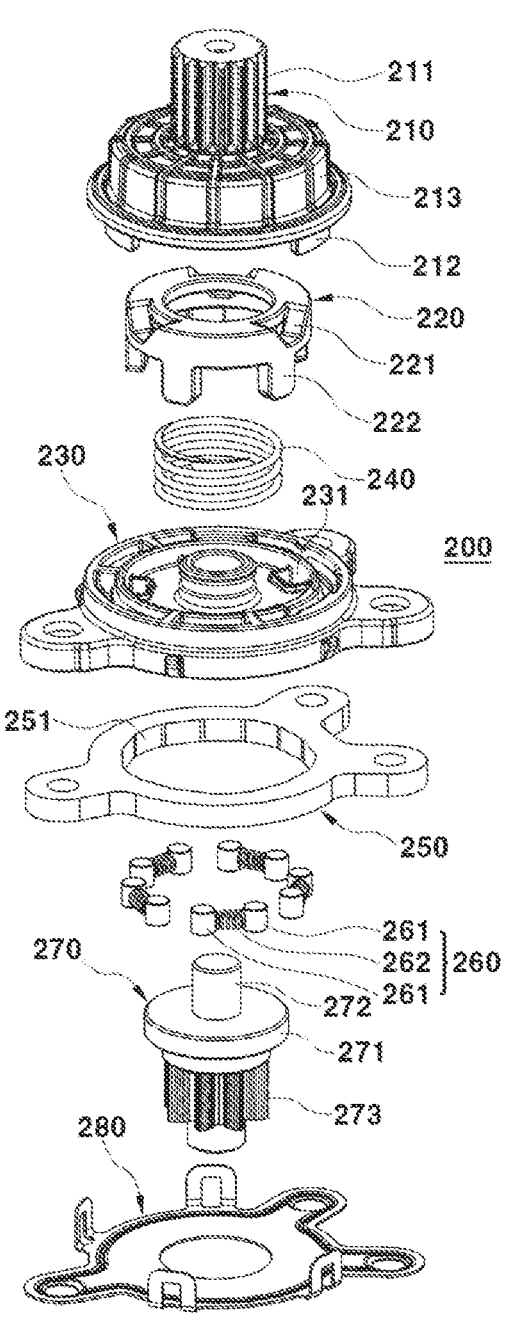
FIG. 6 is an exploded perspective view illustrating the locking device of the relaxation seat for a vehicle according to embodiments of the present disclosure.
Figure 7:
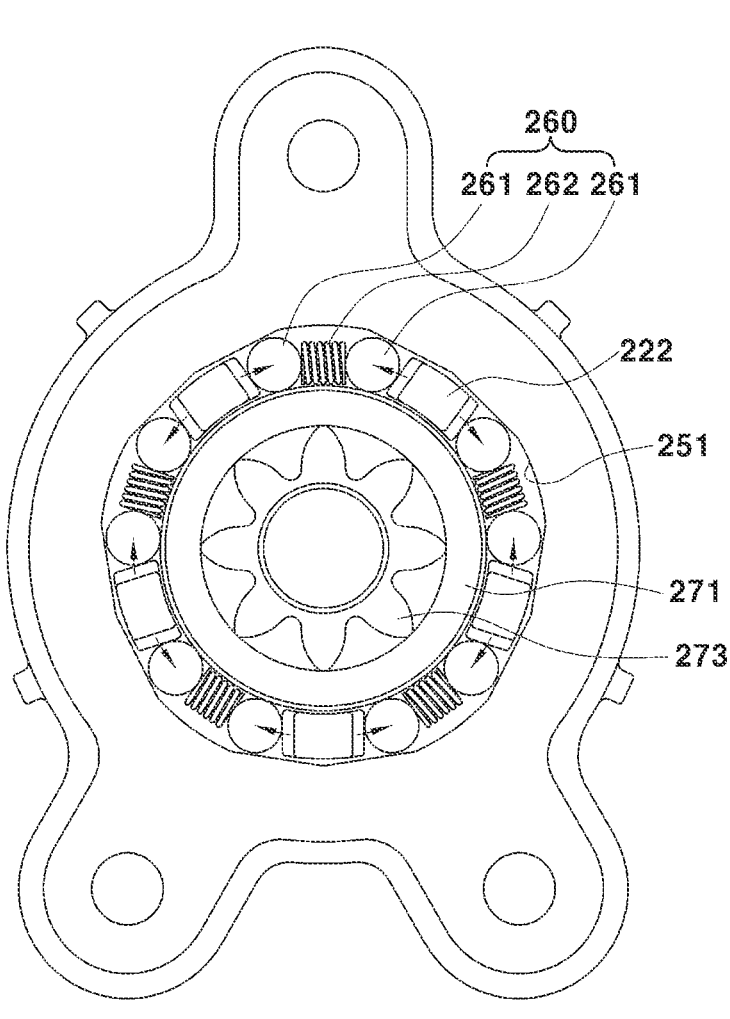
FIG. 7 is a cross-sectional view illustrating a state where locking is performed by the locking device of the relaxation seat for a vehicle according to embodiments of the present disclosure.
Figure 8:
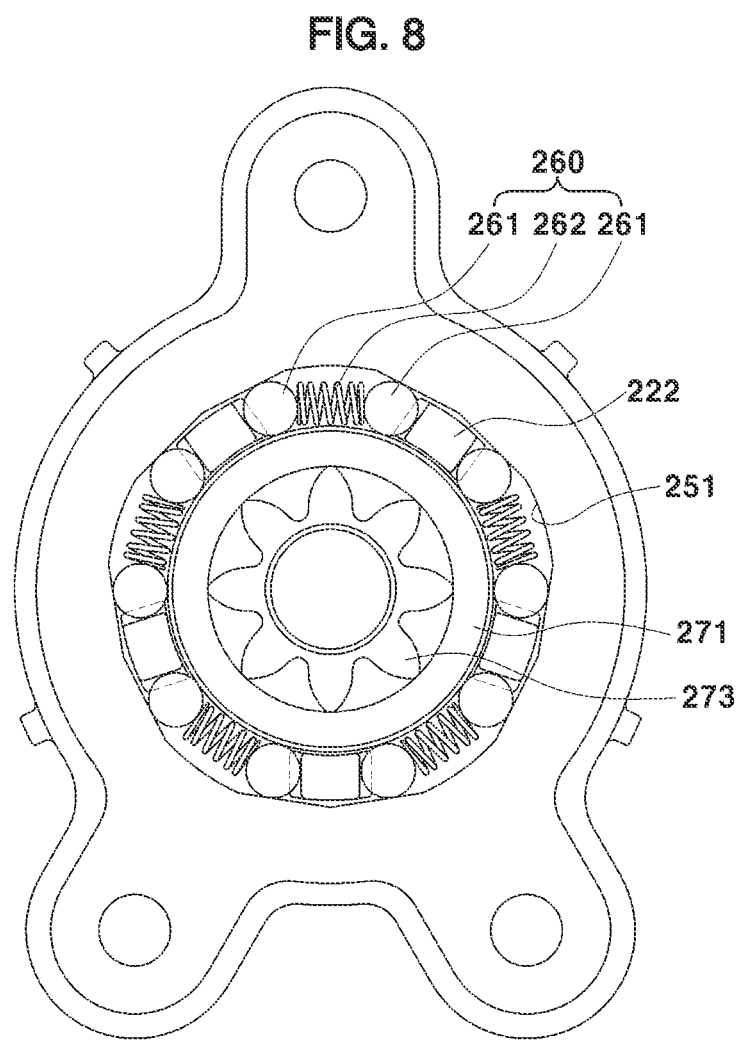
Figure 9:
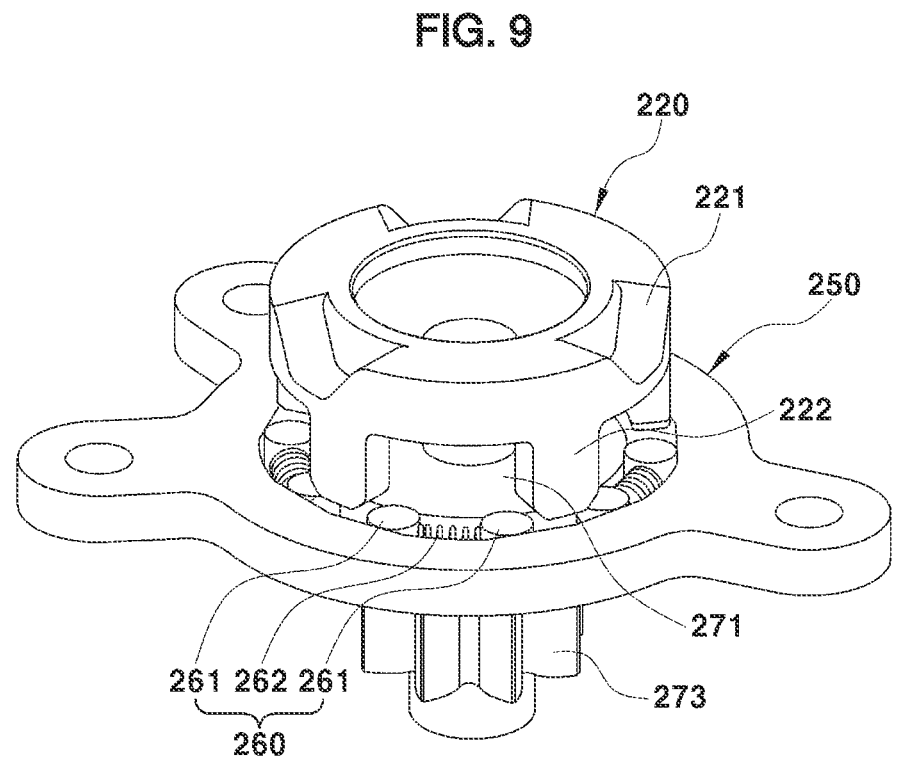

FIG. 6 is an exploded perspective view illustrating the locking device 200 of the relaxation seat for a vehicle according to embodiments of the present disclosure. FIG. 7 is a horizontal cross-sectional view illustrating a state where the locking is performed by the locking device 200. FIG. 8 is an enlarged perspective view illustrating some elements of the locking device 200 to describe a state where the unlocking is performed by the locking device 200. FIG. 9 is a horizontal cross-sectional view illustrating the state where the unlocking is performed by the locking device 200.

The locking device 200 is configured in such a manner that, in a locking state, it performs a function of keeping the pinion gear 273 from being rotated and thus keeping the support bar 150, having the rack gear 151 engaged with the pinion gear 273, from moving backward and forward. Moreover, the locking device 200 is configured in such a manner that, in an unlocking state, it performs a function of allowing the pinion gear 273 to be rotated and thus allowing the support bar 150, having the rack gear 151 engaged with the pinion gear 273, to move backward and forward.

An input block 210 is arranged, as one element of the locking device 200, on the outermost portion thereof. The input block 210 has such a structure that an input gear 211 to be connected to the lever 160 is formed on one side of the input block 210 and that a plurality of sawteeth 212, each of which has such a shape that a width thereof gradually becomes smaller toward the inward direction, are formed on the other side thereof.

Accordingly, the user may perform a manual operation of pushing up the lever 160 in an upward direction that is a direction in which the locking device 200 performs the unlocking or pulling down the lever 160 to an original position thereof in a direction in which the locking device 200 performs the locking. Thus, the input block 210 may be rotated in a direction in which the locking device 200 performs the unlocking or in a direction in which the locking device 200 performs the locking.

An unlocking block 220 is arranged inside of the input block 210. The unlocking block 220 has such a structure that a plurality of sawtooth grooves 221, into which the plurality of sawteeth 212, respectively, on the input block 210 are inserted, are formed in one side of the unlocking block 220 and that a plurality of wedges 222 are formed on the other side thereof.

An intermediate plate 230 is arranged inside of the unlocking block 220. The intermediate plate 230 has such a structure that a plurality of access holes 231 are formed therein. The plurality of wedges 222 on the unlocking block 220 are capable of passing through the plurality of access holes 231, respectively, for entering and exiting them.

In this case, the intermediate plate 230 is combined with an external housing 213 covering the input block 210. A spring 240 is arranged between the unlocking block 220 and the intermediate plate 230. The spring 240 compresses when the unlocking block 220 moves toward the inward direction.

Accordingly, when the user operates the lever 160, the input block 210 is rotated in a locking direction. Thus, the plurality of sawteeth 212 move along inclined surfaces in one direction of the plurality of sawtooth grooves 221, respectively, in a sliding manner, thereby pushing the unlocking block 220 toward the inward direction by pressing thereagainst. Thus, the plurality of wedges 222 on the unlocking block 220 may pass through the plurality of access holes 231, respectively, in the intermediate plate 230 and may move toward the inward direction. Accordingly, the spring 240 arranged between the unlocking block 220 and the intermediate plate 230 enters into a compressing state.

In contrast, when the user operates the lever 160, the input block 210 is rotated in an unlocking direction. The plurality of sawteeth 212 are inserted into the plurality of sawtooth grooves 221, respectively, in such a manner as to reach up to bottom surfaces thereof. Moreover, due to the elastic restoring force of the spring 240, the unlocking block 220 is pushed toward an outward direction. Thus, the plurality of wedges 222 on the unlocking block 220 may pass through the plurality of access holes 231, respectively, in the intermediate plate 230 and may move toward the outward direction.

According to another configuration of the locking device 200, a ring plate 250 is arranged on an inner surface of the intermediate plate 230. The ring plate 250 has such a structure that a plurality of position limitation grooves 251 are formed in an inner circumferential surface thereof in such a manner that they are spaced a predetermined distance apart. Accordingly, the ring plate 250 is combined with an inner surface of the intermediate plate 230 by being brought into close contact therewith.

In addition, a plurality of brake members 260 are arranged in the plurality of position limitation grooves 251, respectively, in the ring plate 250. The plurality of brake members 260 each have such a structure that brake rollers 261 constituting a pair are connected to each other by a spring 262.

In this case, the plurality of brake members 260 are arranged in the plurality of position limitation grooves 251, respectively, in the ring plate 250. Accordingly, the plurality of brake members 260 are kept arranged to be equally spaced along a circumferential direction. A separation space between the brake rollers 261, facing each other, of the adjacent brake members 260 is a space into which the wedge 222 on the unlocking block 220 is inserted in a manner that is separable therefrom.

The locking device 200 further includes a support-bar backward-forward movement guide member 270 that has the pinion gear 273 for allowing the support bar 150 to move backward and forward or for blocking the support bar 150 from moving backward and forward.

To this end, the support-bar backward-forward movement guide member 270 may be configured to include a brake contact ring 271, a shaft 272, and the pinion gear 273. The brake contact ring 271 is capable of being brought into contact with the brake roller 261. The shaft 272 is integrally formed with an outer surface of the brake contact ring 271 and is rotatably connected to a center portion of the intermediate plate 230. The pinion gear 273 is integrally formed with an inner surface of the brake contact ring 271 and is engaged with the rack gear 151 of the support bar 150.

In addition, a cover plate 280 is arranged on the innermost portion of the locking device 200. The cover plate 280 is combined with the ring plate 250 by being brought into close contact therewith, while covering the brake member 260 and the brake contact ring 271 of the support-bar backward-forward movement guide member 270.

At this point, the pinion gear 273 of the support-bar backward-forward movement guide member 270 passes through the cover plate 280 and is arranged in a protruding manner on the inner portion of the seat cushion upper frame 120. Thus, the pinion gear 273 is engaged with the rack gear 151 of the support bar 150.

Accordingly, when the user operates the lever 160, the input block 210 is rotated in the locking direction. Thus, the plurality of sawteeth 212 move along the inclined surfaces in one direction of the plurality of sawtooth grooves 221, respectively, in a sliding manner, thereby pushing the unlocking block 220 toward the inward direction by pressing thereagainst. Thus, the plurality of wedges 222 on the unlocking block 220 may pass through the plurality of access holes 231, respectively, in the intermediate plate 230 and may move toward the inward direction. Subsequently, each of the plurality of wedges 222 on the unlocking block 220 is inserted between the brake rollers 261, facing each other, of the adjacent brake members 260. At the same time, the brake rollers 261 are brought into close contact with an outer circumferential surface of the brake contact ring 271 by pressing thereagainst, and thus the pinion gear 273 may be kept from being rotated.

At this point, when the pinion gear 273 is kept from being rotated, the support bar 150 having the rack gear 151 that is engaged with the pinion gear 273 is also kept from moving backward and forward.

In contrast, when the user operates the lever 160, the input block 210 is rotated in the unlocking direction. Thus, the plurality of sawteeth 212 are inserted into the plurality of sawtooth grooves 221, respectively, in such a manner as to reach up to the bottom surfaces thereof. Moreover, due to the elastic restoring force of the spring 240, the unlocking block 220 is pushed toward the outward direction. Thus, the plurality of wedges 222 on the unlocking block 220 may pass through the plurality of access holes 231, respectively, in the intermediate plate 230 and may move toward the outward direction. Subsequently, the plurality of wedges 222 on the unlocking block 220 are removed out of the brake rollers 261, facing each other, of the adjacent brake members 260. At the same time, the brake rollers 261 are no longer brought into close contact with the outer circumferential surface of the brake contact ring 271 without being pressed thereagainst, and thus the pinion gear 273 may be no longer kept from being rotated. Accordingly, the pinion gear 273 is kept rotatable.

At this point, when the pinion gear 273 is no longer kept from being rotated and thus is kept rotatable, the support bar 150 having the rack gear 151 that is engaged with the pinion gear 273 is kept movable backward and forward.

An operational flow for the relaxation seat for a vehicle according to embodiments of the present disclosure that has the above-described configuration will be described below.

Figure 4:
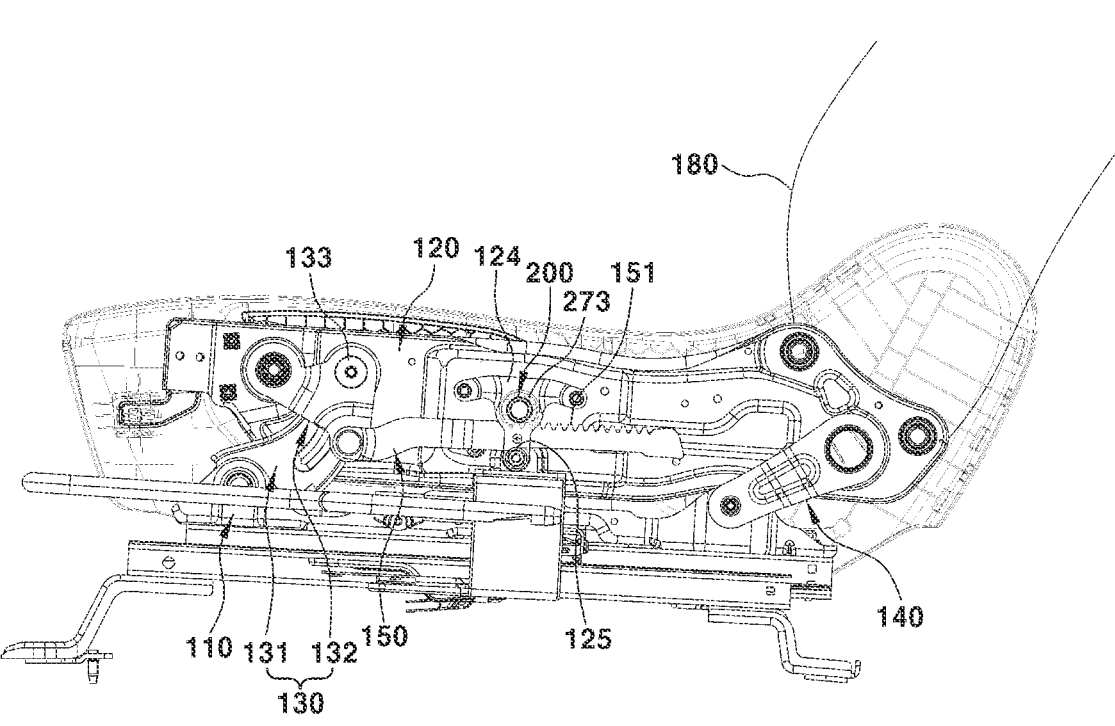
FIG. 4 is a side view illustrating a state where the relaxation seat for a vehicle according to embodiments of the present disclosure is not yet adjusted for realizing relaxation positioning.
Figure 5:
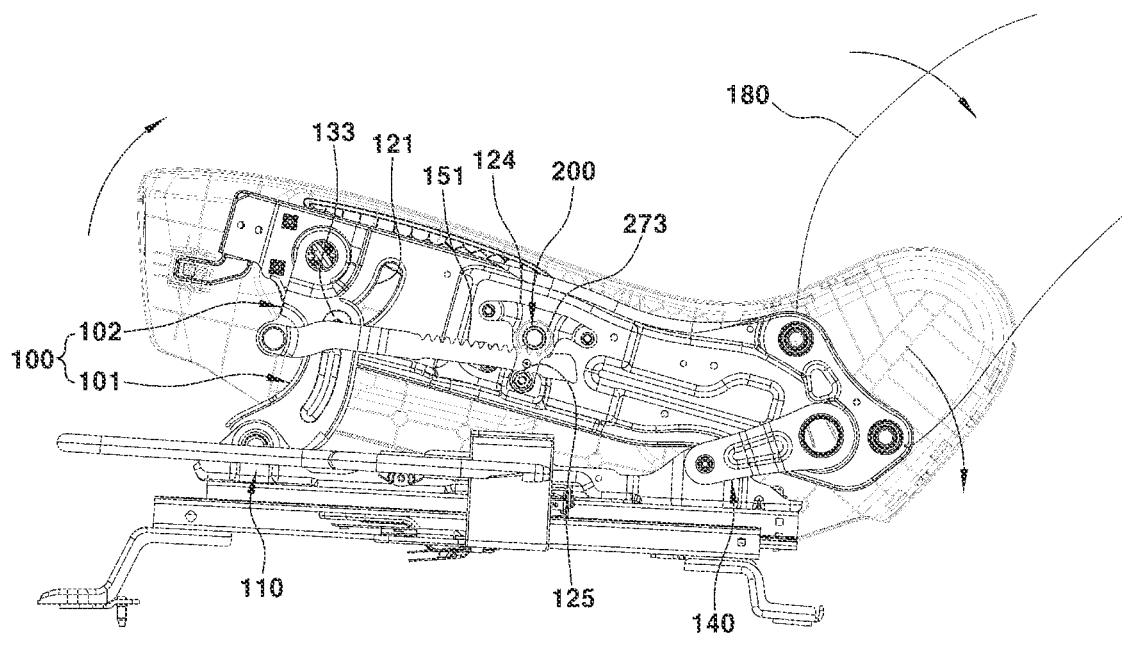
FIG. 5 is a side view illustrating a state where the relaxation seat for a vehicle according to embodiments of the present disclosure is adjusted for realizing the relaxation positioning.

FIG. 4 is a side view illustrating a state where the manual relaxation seat for a vehicle according to embodiments of the present disclosure is not yet adjusted for realizing the relaxation positioning. FIG. 5 is a side view illustrating a state where the manual relaxation seat for a vehicle according to embodiments of the present disclosure is adjusted for realizing the relaxation positioning.

As described in FIGS. 4 and 5, a seat back frame 180 is connected to the rear end portion of the seat cushion upper frame 120.

First, in order to realize the relaxation positioning, the user performs an operation of pushing down the lever 160 in the unlocking direction.

Subsequently, when the user operates the lever 160, the input block 210 is rotated in the unlocking direction. Thus, the plurality of sawteeth 212 are inserted into the plurality of sawtooth grooves 221, respectively, in such a manner as to reach up to the bottom surfaces thereof. Moreover, due to the elastic restoring force of the spring 240, the unlocking block 220 is pushed toward the outward direction. Thus, the plurality of wedges 222 on the unlocking block 220 pass through the plurality of access holes 231, respectively, in the intermediate plate 230 and move toward the outward direction.

Subsequently, the plurality of wedges 222 on the unlocking block 220 are removed out of the brake rollers 261, facing each other, of the adjacent brake members 260. At the same time, the brake rollers 261 are no longer brought into close contact with the outer circumferential surface of the brake contact ring 271 without pressing thereagainst, and thus the pinion gear 273 is no longer kept from being rotated. Accordingly, the pinion gear 273 is kept rotatable.

Next, when the user leans his/her upper body against a seat back having the seat back frame 180 as a frame body, a load of a predetermined magnitude or greater is applied to the seat back, and, at the same time, the user's hip weight is applied to the rear end portion of the seat cushion upper frame 120.

Accordingly, when the rear link 140 is rotated in the push-down direction, the rear end portion of the seat cushion upper frame 120 is lowered, and the front end portion of the seat cushion upper frame 120 is raised. At this point, the first front link 131 and the second front link 132 that constitute the front link 130 are rotated in the pull-up direction.

More specifically, when the rear link 140 is rotated in the push-down direction, the rear end portion of the seat cushion upper frame 120 is lowered, and, at the same time, the front end portion of the seat cushion upper frame 120 is raised. At this point, the guide pin 134 moves to a lower end portion of the guide hole 121 formed in the seat cushion upper frame 120 in a sliding manner. Thus, the first front link 131 and the second front link 132 that constitute the front link 130 are rotated in the pull-up direction.

At this point, the guide pin 134 coaxially extends from the hinge pin 133 that hinge-connects between the first front link 131 and the second front link 132. Therefore, when the guide pin 134 moves to the lower end portion of the guide hole 121 formed in the seat cushion upper frame 120 in a sliding manner, the hinge pin 133 also moves to the same position.

In addition, when the hinge pin 133 moves to a position on the lower end portion of the guide hole 121, along with the guide pin 134, with the hinge pin 133, the first front link 131 is rotated toward the front direction. Thus, the first front link 131 is raised. At the same time, with the hinge pin 133, the second front link 132 is pushed toward the front direction. Thus, a lower end portion of the second front link 132 is rotated toward the front direction.

In addition, when the second front link 132 is rotated toward the front direction, the support bar 150 hinge-connected to the second front link 132 is dragged, thereby moving toward the front direction.

In addition, when the support bar 150 moves toward the front direction, the rack gear 151 of the support bar 150 rotates the pinion gear 273.

That is, the pinion gear 273 is in a state of being engaged with the rack gear 151 and being rotatable. Therefore, the support bar 150 may move toward the front direction.

At this point, the seat back frame 180 is in a state of being connected to the rear end portion of the seat cushion upper frame 120. Therefore, when the rear link 140 is rotated in the push-down direction, and thus the rear end portion of the seat cushion upper frame 120 is lowered, the seat back frame 180 is arranged in a state of being inclined toward the rear direction (in a state of being reclined).

In this manner, the rear end portion of the seat cushion upper frame 120 is lowered, and, at the same time, the front end portion of the seat cushion upper frame 120 is raised and the seat back frame 180 is inclined toward the rear direction. Thus, as illustrated in FIG. 5, the seat may be adjusted for the relaxation positioning.

At this point, when the user operates the lever 160 in the locking direction, the pinion gear 273 is kept from being rotated, and the support bar 150 having the rack gear 151 engaged with the pinion gear 273 is also kept from moving backward and forward. In addition, the second front link 132 connected to the support bar 150, the first front link 131 connected to the second front link 132, and the like are also fixed without any movement. Thus, the relaxation positioning may be maintained.

In order to realize the relaxation positioning, when the rear end portion of the seat cushion upper frame 120 is lowered, and, at the same time, the front end portion thereof is raised, the elastic restoring force due to the twisting of the torsion spring 170, which returns the seat cushion upper frame 120 to the original position thereof, may be provided.

In contrast, in a case where the user switches the seat from the relaxation positioning to an original position thereof, the user performs the operation of pushing the lever 160 in the unlocking direction, and then no longer applies the user's upper body load to the seat back frame 180, and, at the same time, applies the user's lower body load toward the front end portion of the seat cushion upper frame 120.

At this point, when the user's lower body load is applied toward the front end portion of the seat cushion upper frame 120, the elastic restoring force due to the twisting of the torsion spring 170 is also exerted on the seat cushion upper frame 120. Thus, the front end portion of the seat cushion upper frame 120 may be lowered more easily.

Accordingly, when the rear link 140 is rotated in the pull-up direction, the rear end portion of the seat cushion upper frame 120 is raised, and, at the same time, the front end portion of the seat cushion upper frame 120 is lowered. Accordingly, the guide pin 134 moves to an upper end portion of the guide hole 121 formed in the seat cushion upper frame 120 in a sliding manner. Thus, the first front link 131 and the second front link 132 that constitute the front link 130 are rotated in the push-down direction.

At this point, the guide pin 134 coaxially extends from the hinge pin 133 that hinge-connects between the first front link 131 and the second front link 132. Therefore, when the guide pin 134 moves to the upper end portion of the guide hole 121 formed in the seat cushion upper frame 120 in a sliding manner, the hinge pin 133 moves to the same position.

In addition, when the hinge pin 133 moves to a position on the upper end portion of the guide hole 121, along with the guide pin 134, the hinge pin 133 rotates the first front link 131 toward the rear direction. Thus, the first front link 131 is lowered, and, at the same time, with the hinge pin 133, the second front link 132 is pulled toward the rear direction. Thus, the lower end portion of the second front link 132 is rotated toward the rear direction.

In addition, when the second front link 132 is rotated toward the rear direction, the support bar 150 hinge-connected to the second front link 132 is pushed toward the rear direction, thereby moving toward the rear direction.

In addition, when the support bar 150 moves toward the rear direction, the rack gear 151 of the support bar 150 rotates the pinion gear 273.

That is, the pinion gear 273 is engaged with the rack gear 151, and thus is kept rotatable. Therefore, the support bar 150 may move toward the rear direction.

Accordingly, as illustrated in FIG. 4, the rear end portion of the seat cushion upper frame 120 is raised to an original position thereof, and, at the same time, the front end portion of the seat cushion upper frame 120 is lowered to an original position thereof. Moreover, the seat back frame 180 connected to the seat cushion upper frame 120 is also rotated toward the front direction to return to an original position thereof. Thus, the seat may return to the original position thereof.

At this point, when the user operates the lever 160 in the locking direction, the pinion gear 273 is kept from being rotated, and the support bar 150 having the rack gear 151 engaged with the pinion gear 273 is also kept from moving backward and forward. In addition, the second front link 132 connected to the support bar 150, the first front link 131 connected to the second front link 132, and the like are also fixed without any movement. Thus, the seat may be kept positioned at the original position thereof.

As described above, when the user manually operates the lever 160, the locking device 200 is unlocked. In this state, when the user leans his/her upper body against the seat back, thereby applying a load of a predetermined magnitude or greater, the seat back is reclined toward the rear direction, thereby lowering a rear end portion of a seat cushion. At the same time, a front end portion of the seat cushion is raised. Thus, the relaxation positioning for reducing fatigue may be easily maintained.

Embodiments of the present disclosure are described in detail above. However, the claimed scope of the present disclosure is not limited to the above-mentioned embodiments. Various modifications and improvements that a person of ordinary skill in the art makes using the technical idea of the present disclosure that is defined in the following claims are also included in the claimed scope of the present disclosure.

What is claimed is:

1. A relaxation seat for a vehicle, the relaxation seat comprising:
    a seat cushion lower frame;
    a seat cushion upper frame connected to the seat cushion lower frame in a tilting-enabled manner;
    a seat back frame connected to the seat cushion upper frame;
    a locking device mounted at a predetermined position on the seat cushion upper frame;
    a front link hinge-connecting between the seat cushion upper frame and a front end portion of the seat cushion lower frame;
    a rear link hinge-connecting between the seat cushion upper frame and a rear end portion of the seat cushion lower frame; and
    a support bar connecting between the locking device and the front link in a manner that is movable backward and forward and configured to support the front link for rotation or fixation thereof, wherein the locking device is configured to selectively lock or unlock backward and forward movement of the support bar.

2. The relaxation seat of claim 1, wherein the front link comprises:
    a first front link, wherein a lower end portion of the first front link is hinge-connected to the seat cushion lower frame; and
    a second front link, wherein an upper end portion of the second front link is hinge-connected to a connection pipe fastened to the seat cushion upper frame, a front end portion of the support bar is hinge-connected to a first side of a lower end portion of the second front link, and an upper end portion of the first front link and a second side of the lower end portion of the second front link are connected to each other with a hinge pin.

3. The relaxation seat of claim 2, further comprising a guide hole disposed in the seat cushion upper frame and configured to receive the hinge pin and to guide the first front link and the second front link to move along a circular path.

4. The relaxation seat of claim 3, further comprising a guide pin integrally provided on the hinge pin in a manner extending from the hinge pin, the guide pin being configured to be inserted into the guide hole.

5. The relaxation seat of claim 2, further comprising a stepped portion disposed on the first side of the lower end portion of the second front link to which the front end portion of the support bar is hinge-connected in a manner that protrudes toward an inward direction therefrom, wherein the stepped portion is configured to prevent the support bar from interfering with the first and second front links when the support bar moves backward and forward.

6. The relaxation seat of claim 2, further comprising a torsion spring inserted into the connection pipe, wherein a first end portion of the torsion spring is fixed and a second end portion of the torsion spring is connected to the seat cushion upper frame.

7. The relaxation seat of claim 6, wherein, in order to cause the torsion spring to be twisted, the second end portion of the torsion spring passes through a spring through-hole disposed in the seat cushion upper frame and is fixed to a spring hanger attached to an outer surface of the seat cushion upper frame.

8. The relaxation seat of claim 1, further comprising a cradling bracket mounted on an inner portion of the seat cushion upper frame, wherein the cradling bracket is configured to support a rear end portion of the support bar to prevent the rear end portion from falling down.

9. The relaxation seat of claim 8, further comprising a guide roller mounted on a lower portion of the cradling bracket, wherein the guide roller is configured to slidably support a bottom portion of the support bar.

10. The relaxation seat of claim 1, further comprising a lever connected to the locking device, wherein the lever is configured to be operated to allow the locking device to perform a locking operation or an unlocking operation.

11. A relaxation seat for a vehicle, the relaxation seat comprising:
  a seat cushion lower frame configured to be mounted on a seat rail;
  a seat cushion upper frame connected to the seat cushion lower frame in a tilting-enabled manner;
  a seat back frame connected to the seat cushion upper frame;
  a locking device mounted at a predetermined position on the seat cushion upper frame;
  a front link hinge-connecting between the seat cushion upper frame and a front end portion of the seat cushion lower frame;
  a rear link hinge-connecting between the seat cushion upper frame and a rear end portion of the seat cushion lower frame;
  a support bar connecting between the locking device and the front link in a manner that is movable backward and forward and configured to support the front link for rotation or fixation thereof;
  a pinion gear connected to an inner portion of the locking device mounted on the seat cushion upper frame, wherein the pinion gear is rotatable when the locking device performs an unlocking operation; and
  a rack gear provided on an upper surface of the support bar, wherein the pinion gear is engaged with the rack gear.

12. The relaxation seat of claim 11, wherein the locking device comprises:
  an input block;
  an input gear to be connected to a lever disposed on a first side of the input block;
  a plurality of sawteeth disposed on a second side of the input block, wherein each of the plurality of sawteeth has a shape such that a width thereof gradually becomes smaller toward an inward direction;
  an unlocking block;
  a plurality of sawtooth grooves disposed in a first side of the unlocking block and configured to receive the plurality of sawteeth, respectively; and
  a plurality of wedges disposed on a second side of the unlocking block.

13. The relaxation seat of claim 12, wherein the locking device further comprises:
  an intermediate plate comprising a plurality of access holes disposed therein, the plurality of access holes being configured to receive the plurality of wedges, respectively, wherein the intermediate plate is combined with an external housing covering the input block;
  a first spring arranged between the unlocking block and the intermediate plate and configured to compress in a situation in which the unlocking block moves toward the inward direction; and
  a ring plate comprising a plurality of position limitation grooves disposed in an inner circumferential surface thereof, wherein the plurality of position limitation grooves spaced a predetermined distance apart, and wherein the ring plate is combined with the intermediate plate.

14. The relaxation seat of claim 13, wherein the locking device further comprises a plurality of brake members each comprising a pair of brake rollers connected to each other by a second spring, wherein the plurality of brake members are arranged in the plurality of position limitation grooves, respectively, in the ring plate.

15. The relaxation seat of claim 14, wherein the locking device further comprises a support-bar backward-forward movement guide member comprising:
  a brake contact ring configured to be brought into contact with the brake rollers;
  a shaft integrally provided with an outer surface of the brake contact ring and rotatably connected to a center portion of the intermediate plate; and
  the pinion gear integrally provided with an inner surface of the brake contact ring and engaged with the rack gear of the support bar.

16. The relaxation seat of claim 15, wherein the locking device further comprises a cover plate mounted on the ring plate while covering the brake members and the brake contact ring.

17. The relaxation seat of claim 16, wherein, in a case in which the input block is rotated in a locking direction by operating the lever, the plurality of sawteeth on the input block are configured to press against the unlocking block toward the inward direction while being removed out of the plurality of sawtooth grooves, respectively, in the unlocking block.

18. The relaxation seat of claim 17, wherein each of the plurality of wedges on the unlocking block is configured to be inserted between the brake rollers, facing each other, of adjacent ones of the brake members, and the brake rollers are configured to be brought into close contact with an outer circumferential surface of the brake contact ring by pressing thereagainst, thereby keeping the pinion gear from being rotated.

19. The relaxation seat of claim 16, wherein, in a case in which the input block is rotated in an unlocking direction by operating the lever, the plurality of sawteeth on the input block are configured to be inserted into the plurality of sawtooth grooves, respectively, in the unlocking block, and the unlocking block is configured to be pushed toward an outward direction due to an elastic restoring force of the second spring.

20. A relaxation seat for a vehicle, the relaxation seat comprising:

a seat cushion lower frame configured to be mounted on a seat rail;

a seat cushion upper frame connected to the seat cushion lower frame in a tilting-enabled manner;

a seat back frame connected to the seat cushion upper frame;

a locking device mounted at a predetermined position on the seat cushion upper frame;

a front link hinge-connecting between the seat cushion upper frame and a front end portion of the seat cushion lower frame;

a rear link hinge-connecting between the seat cushion upper frame and a rear end portion of the seat cushion lower frame; and a support bar connecting between the locking device and the front link in a manner that is movable backward and forward and configured to support the front link for rotation or fixation thereof;

wherein the front link comprises:

a first front link, wherein a lower end portion of the first front link is hinge-connected to the seat cushion lower frame; and a second front link, wherein an upper end portion of the second front link is hinge-connected to a connection pipe fastened to the seat cushion upper frame, a front end portion of the support bar is hinge-connected to a first side of a lower end portion of the second front link, and an upper end portion of the first front link and a second side of the lower end portion of the second front link are connected to each other with a hinge pin.

\* \* \* \* \*